United States Patent
Palreddy et al.

(10) Patent No.: US 12,009,881 B2
(45) Date of Patent: Jun. 11, 2024

(54) DYNAMIC TEST BENCH FOR AIRCRAFT SYSTEM TESTING

(71) Applicant: SMARTSKY NETWORKS LLC, Morrisville, NC (US)

(72) Inventors: Praveen Palreddy, Ashburn, VA (US); Mohammed Elabd, Aldie, VA (US); Richard Canning, Rockville, MD (US); David Claassen, Leesburg, VA (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 44 days.

(21) Appl. No.: 17/923,097

(22) PCT Filed: Apr. 30, 2021

(86) PCT No.: PCT/US2021/030054
§ 371 (c)(1),
(2) Date: Nov. 3, 2022

(87) PCT Pub. No.: WO2021/225872
PCT Pub. Date: Nov. 11, 2021

(65) Prior Publication Data
US 2023/0155703 A1    May 18, 2023

Related U.S. Application Data

(60) Provisional application No. 63/020,171, filed on May 5, 2020.

(51) Int. Cl.
*H04B 17/391* (2015.01)
*H04B 7/185* (2006.01)

(52) U.S. Cl.
CPC ..... *H04B 17/3912* (2015.01); *H04B 7/18506* (2013.01)

(58) Field of Classification Search
CPC .................. H04B 17/3912; H04B 7/18506
(Continued)

(56) References Cited

U.S. PATENT DOCUMENTS

2003/0093187 A1*  5/2003  Walker ............... B64D 45/0059
                                              701/1
2008/0151763 A1   6/2008  Lee et al.
2018/0343073 A1   11/2018 Hinton et al.

OTHER PUBLICATIONS

Chaoxing Yan, et al., "A Comprehensive Survey of UAV Communication Channel Modeling," IEEE Access, (Aug. 2019) vol. 7.
(Continued)

*Primary Examiner* — Fitwi Y Hailegiorgis
(74) *Attorney, Agent, or Firm* — Burr & Forman LLP

(57) ABSTRACT

An air to ground (ATG) communication system testing platform may be configured to operably couple a base station to an aircraft base radio in a lab environment. The testing platform may include a position simulator and a channel simulator. The position simulator may be configured to generate simulated aircraft position information and communicate the simulated aircraft position information to an aircraft base radio and a base band unit of the base station. The channel simulator may operably couple a remote radio head of the base station to the aircraft base radio, and may be configured to emulate channel conditions with respect to transmission of signaling generated by the remote radio head for communication to the aircraft base radio based on the emulated channel conditions.

18 Claims, 7 Drawing Sheets

(58) Field of Classification Search
USPC .......................................................... 375/224
See application file for complete search history.

(56) References Cited

OTHER PUBLICATIONS

International Search Report and Written Opinion from International Application No. PCT/US2021/030054 filed Apr. 30, 2021, all enclosed pages cited.

* cited by examiner

DYNAMIC TEST BENCH FOR AIRCRAFT SYSTEM TESTING

CROSS-REFERENCE TO RELATED APPLICATIONS

This application claims priority under 35 U.S.C. § 119(e) to U.S. Provisional Application No. 63/020,171, filed May 5, 2020, which is expressly incorporated by reference herein in its entirety.

TECHNICAL FIELD

Example embodiments generally relate to wireless communications and, more particularly, relate to a solution for the testing of aircraft communications systems prior to installation on the aircraft.

BACKGROUND

High speed data communications and the devices that enable such communications have become ubiquitous in modern society. These devices make many users capable of maintaining nearly continuous connectivity to the Internet and other communication networks. Although some of these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

As improvements are made to network infrastructures to enable better communications with in-flight receiving devices of various kinds, it is expected that more solutions will be put in place to try to alleviate the problems discussed above. These improvements may result in the provision of new equipment on the aircraft. In a typical situation, in order to confirm the performance of the new equipment, a test flight would need to be performed. However, doing so is very expensive, and would therefore preferably be avoided if possible.

BRIEF SUMMARY OF SOME EXAMPLES

In one example embodiment, an air to ground (ATG) communication system testing platform may be provided. The testing platform may be configured to operably couple a base station to an aircraft base radio in a lab environment. The testing platform may include a position simulator and a channel simulator. The position simulator may be configured to generate simulated aircraft position information and communicate the simulated aircraft position information to an aircraft base radio and a base band unit of the base station. The channel simulator may operably couple a remote radio head of the base station to the aircraft base radio, and may be configured to emulate channel conditions with respect to transmission of signaling generated by the remote radio head for communication to the aircraft base radio based on the emulated channel conditions.

In another example embodiment, a method of testing airborne and ground based ATG communication equipment in a lab environment may be provided. The method may include operably coupling a base station to an aircraft base radio via a testing platform, generating, via the testing platform, a simulated flight path, and simulating channel conditions associated with the simulated flight path, via the testing platform, to communicate information between the aircraft base radio and the base station based on the simulated channel conditions.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
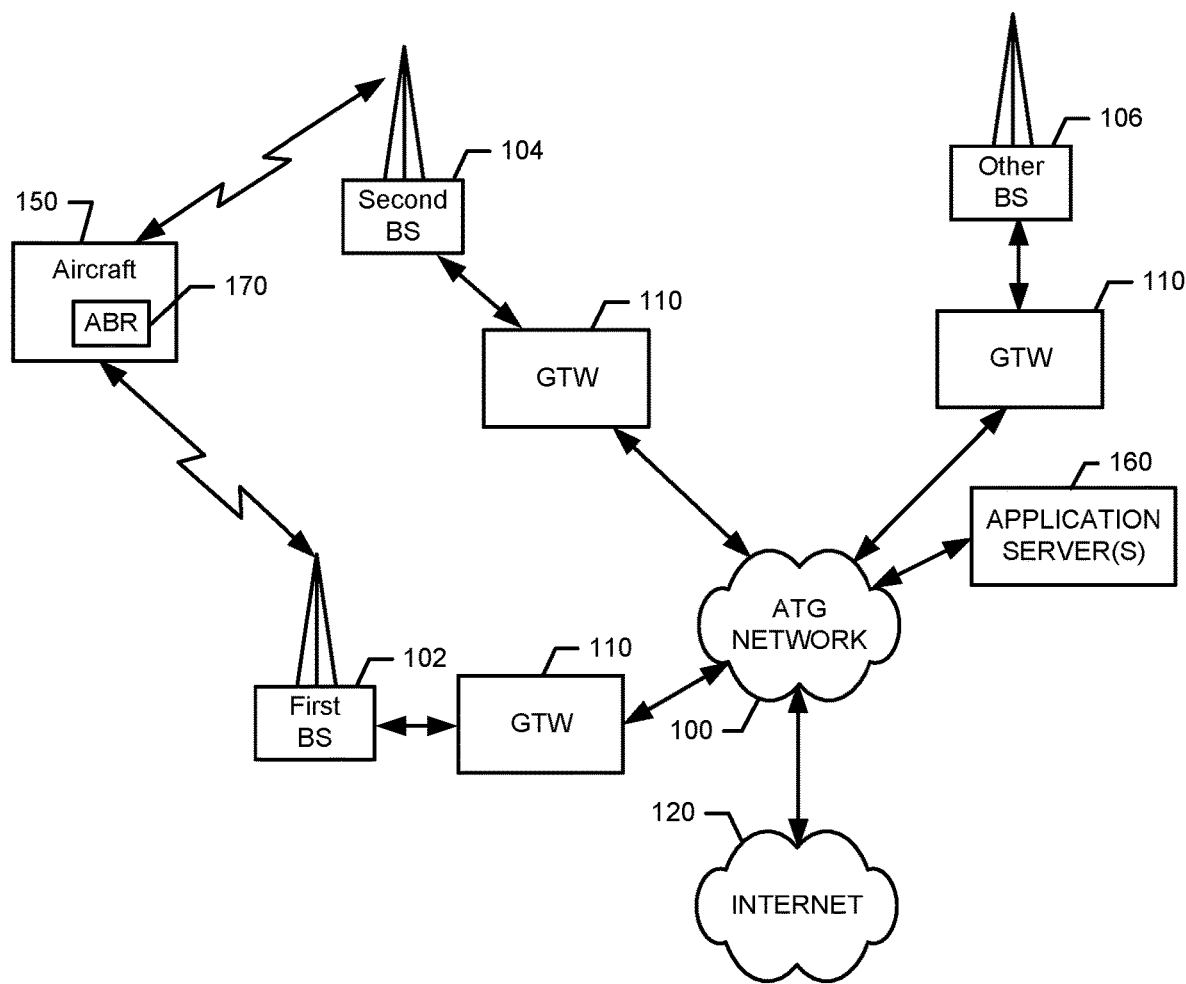
FIG. 1 illustrates a functional block diagram of an ATG communication network that may benefit from employing an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals may be used to refer to like elements throughout. Furthermore, as used herein, the term "or" is to be interpreted as a logical operator that results in true whenever one or more of its operands are true.

As used in herein, the terms "component," "module," and the like are intended to include a computer-related entity, such as but not limited to hardware, firmware, or a combination of hardware and software (i.e., hardware being configured in a particular way by software being executed thereon). For example, a component or module may be, but is not limited to being, a process running on a processor, a processor (or processors), an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Some example embodiments described herein provide strategies for improved air-to-ground (ATG) wireless communication system performance. In this regard, some example embodiments may provide improved capability for testing system components end-to-end without conducting a test flight. In this regard, example embodiments may provide a dynamic bench testing platform (e.g., a "dynamic test bench") that can be constructed in the lab, but provide full simulation of a radio access network (RAN) subsystem for testing of air-to-ground (ATG) broadband network services incorporating 4G, 5G or other long-term evolution (LTE) or future network technologies.

In general, ground based ATG RAN components, which provide the functions and performance of LTE eNBs (evolved nodeBs), are operably coupled to aircraft-based ATG RAN components aboard the aircraft, which provide the functions and performance of LTE user equipment (UE). Meanwhile, an LTE evolved packet core (EPC) provides mobility management, authentication, authorization, and provides the functions of performance of the LTE EPC. Whereas the ground antenna (e.g., of the eNB) provides the capability of transmitting and receiving radio frequency (RF) signals, other ground ancillary equipment converts, regulates and distributes electrical power for the ground components and network interfaces to ground LNRs and network backbone point of presence. The aircraft antenna provides the capability to transmit and receive RF signals. Meanwhile, aircraft interconnection cables provide the signal, power and ground interconnections between the aircraft, aircraft base radio (ABR) and the aircraft antenna. The ground ATG RAN provides the digital, RF and analog processing functions of the LTE eNB.

The dynamic test bench is a high performance lab environment setup, which can be used for ATG network simulation. In this regard, the dynamic test bench provides a lab context in which full connectivity of an ATG network can be simulated so that testing of ATG broadband communication of network components can be provided. Performance and operation of the ATG network (and specific components thereof) can therefore be completed without needing to conduct test flights. Moreover, numerous scenarios can be tested with realistic conditions being simulated accurately in order to ensure that the testing fully conforms and translates to actual operating conditions when equipment is ultimately deployed in the ATG network.

FIG. 1 illustrates a functional block diagram of an ATG network 100 that may benefit from employment of an example embodiment. As shown in FIG. 1, a first BS 102 and a second BS 104 may each be base stations of the ATG network 100. The ATG network 100 may further include other BSs 106, and each of the BSs may be in communication with the ATG network 100 via a gateway (GTW) device 110. The ATG network 100 may further be in communication with a wide area network such as the Internet 120 or other communication networks. In some embodiments, the ATG network 100 may include or otherwise be coupled to a packet-switched core network. It should also be understood that the first BS 102, the second BS 104 and any of the other BSs 106 may be either examples of base stations employing antennas configured to communicate via network frequencies and protocols defined for the ATG network 100 with an aircraft 150.

The ATG network 100 may also be referred to as a core network. In some embodiments, the core network and all of the base stations of the ATG network 100 (e.g., the first BS 102, the second BS 104 and the other BSs 106) may combine with a wired transport network (e.g., including the GTW devices 110 and other transport network components) to form a radio access network (RAN). Radio links between the RAN and communications system equipment on the aircraft 150 may facilitate the ATG communications and define the coverage area of the ATG network 100. As used herein, the term RAN refers to the deployed network providing communications (Radio Frequency) coverage to aircraft 150 while inflight.

The aircraft 150 may be in-flight and may move between coverage areas (defined in 3D space above the surface of the earth) that are associated with respective ones of the first BS 102, the second BS 104 and other BSs 106. These coverage areas may overlap such that continuous coverage can be defined and the aircraft 150 can sequentially communicate with various ones of the BSs as the aircraft 150 travels via handovers. In some cases, handovers of receivers on aircraft and/or various network control related functionalities may be accomplished under the control of a network component such as a network controller.

The network controller could be located at one (i.e., centralized) or more (i.e., distributed) locations within the ATG network 100. In some cases, the network controller or other components that are used by the network controller may be located at one or more application servers 160 that form a portion of, or are otherwise in communication with, the ATG network 100. The network controller may include, for example, switching functionality. Thus, for example, the network controller may be configured to handle routing calls to and from the aircraft 150 (or to communication equipment on the aircraft 150) and/or handle other data or communication transfers between the communication equipment on the aircraft 150 and the ATG network 100. In some embodiments, the network controller may function to provide a connection to landline trunks when the communication equipment on the aircraft 150 is involved in a call. In addition, the network controller may be configured for controlling the forwarding of messages and/or data to and from communication equipment on the aircraft 150, and may also control the forwarding of messages for the base stations. The network controller may be coupled to a data network, such as a local area network (LAN), a metropolitan area network (MAN), and/or a wide area network (WAN) (e.g., the Internet 120) and may be directly or indirectly coupled to the data network. In turn, devices such as processing elements (e.g., personal computers, laptop computers, smartphones, server computers or the like) can be coupled to the communication equipment on the aircraft 150 via the Internet 120. As such, for example, the network controller may control the core network by providing signaling and user data management and routing. The core network may therefore act as the source of provisioned data for each ABR associated with an aircraft and, as such, authenticates activated ABRs based on secure unique ABR identifiers. The core network may also function as the ingress/egress point for all end user traffic destined to and received from network services, applications and the Internet 120.

Although not every element of every possible embodiment of the ATG network 100 is shown and described herein, it should be appreciated that the communication equipment on the aircraft 150 may be coupled to one or more of any of a number of different networks through the ATG network 100. In this regard, the network(s) can be capable of supporting communication in accordance with any one or more of a number of first-generation (1G), second-generation (2G), third-generation (3G), fourth-generation (4G), fifth-generation (5G), long term evolution (LTE) and/or future mobile communication protocols or the like. In some cases, the communication supported may employ communication links defined using unlicensed band frequencies such as 2.4 GHz or 5.8 GHz. Example embodiments may employ time division duplex (TDD), frequency division duplex (FDD), or any other suitable mechanisms for enabling two way communication (to and from the aircraft 150) within the system. Moreover, in some cases, this communication may be accomplished, and one or both of the links associated therewith may be formed, via narrow radio frequency beams that are formed or otherwise resolved by the antenna assemblies associated with the aircraft 150 and/or the base stations (102, 104, 106). As such, beamforming technology may be used to define one or both of the uplink to the aircraft 150 and the downlink from the aircraft 150.

In some embodiments, one or more instances of a beamforming control module may be employed on wireless communication equipment at either or both of the network side or the aircraft side in example embodiments. Thus, in some embodiments, the beamforming control module may be implemented in a receiving station on the aircraft 150 (e.g., a passenger device or device associated with the aircraft's communication system (e.g., a WiFi router) or the ABR). In some embodiments, the beamforming control module may be implemented in the network controller or at some other network side entity (e.g., at a remote radio head (RRH) of each of the base stations). The beamforming control module may be configured to utilize location information (e.g., indicative of a relative location of the aircraft 150 from one of the base stations) to steer or form a narrow beam toward the target (e.g., the aircraft 150) from the transmitting entity (e.g., the first BS 102). The narrow beam may then reach the target (e.g., the aircraft 150) at an angle of arrival (in 3D space) determined by the relative location.

As can be appreciated from FIG. 1, for each instance of the aircraft 150, the connection of the aircraft 150 to the ATG network 100 for wireless communication purposes may include an instance of the ABR 170. The ABR 170 may include the entire ATG communications system installed in the aircraft 150. The ABR 170 may include, but is not limited to, the aircraft radio, antennas and associated electronic and power cabling. As referred to herein, the ABR 170 (or the aircraft radio thereof) may include multiple measurement, processing, control and communications functions including, but not limited to: radio frequency (RF) transmission and receive, cell site selection and handover, protocol signaling and user data communications with the ground segments of the ATG network 100 (similar to a cell-phone or end-user device in a traditional wireless network). The communication function of the aircraft radio may be collectively defined as the Aircraft User Equipment or AUE. The aircraft radio may also include functions related to the measurement, logic and control required for antenna selection and antenna beam control where multiple directional antennas or antenna beam steering (electrical and/or mechanical) is deployed as a part of the aircraft side of the ATG system. The aircraft radio also provides a mechanical, electrical and communications protocol interface (or interfaces) to networking equipment on the aircraft 150 including, but not limited to wireless access points, on-board wired networks (e.g. Ethernet) and avionics networks (e.g. ARINC-429).

Provisioning, activation and authentication for new devices to a network occur as defined specifically by the network protocol being employed. Thus, for example embodiments employed in connection with wireless cellular networks, or similar networks, the processes for provisioning, activation and authentication may be similar to those defined by the Third Generation Partnership Project (3GPP), or 4G or LTE standards for wireless cellular networks. Within such a framework, provisioning is a process and storage systems within the core network that retains (for reference) a list of authorized unique ABR identifiers that are allowed to access network services along with the services each ABR is entitled to as well as the Quality of Service (QoS) to be provided to the ABR 170. A unique ABR identifier (and thus the associated ABR) may be activated with the unique identifier that has been authorized for service. Authentication is the process by which the core network validates that an ABR attempting to obtain service from the network is validated. The process typically includes the establishment of a secure link between the ABR 170 and the core network, and confirmation by the core network that the unique identifier associated with (shared by) the ABR 170 is provisioned and activated on the network. Once authenticated, the ABR 170 is attached to the network and may pass signaling and user data/access network services.

Referring still to FIG. 1, the ABR 170 may function similarly to traditional cellular User Equipment (UE). Thus, in operation, as the ABR 170 enters the coverage area of the ATG RAN, the ABR 170 may be configured to, based on location information (and depending upon the specific protocol implemented), identify a candidate serving cell site (e.g., first BS 102 or second BS 104) that may be available. The ABR 170 may make signal strength measures of the various available control signals from the first and second BSs 102 and 104 and may select the strongest/best cell site to which it will "attach". Where the ABR 170 includes multiple directional antennas and/or antenna beam forming technology, this process will also include measurements of the best directional antenna and/or determination of the best possible beam angle (and formation of that beam) to assure the strongest possible radio link between the ABR 170 and the serving cell site amongst the first or second BSs 102 or 104.

Depending upon the specific protocol implementation, the "attach" procedure between the ABR 170 and the ATG network 100 may require the exchange of (typically) encrypted authentication data between the ABR 170 and the core network. In general, each ABR is uniquely identifiable by the core network by a provisioning process that occurs before the first time an ABR attaches to the network. This process includes the entry, processing and storage of a secure unique identifier for each ABR that authorizes the ABR to use the network services and may further identify specific network services and QoS available to the ABR 170, as mentioned above. During an "attach" attempt, an encrypted and secure exchange of information (protocol specific) may occur in which the ABR 170 and core network will exchange encryption information, establish a secure link, and the ABR 170 will then provide its uniquely identifying information. Upon verification of this information against the provisioning data stored within the core network (e.g., at the application server 160), the core network will then authenticate the ABR 170 and allow the ABR 170 to complete the network attach process and begin communications of user data (and other signaling data as may be associated with such network functionality as cell site hand-off and data routing). In this regard, the ABR 170 may be handed off between beams or sectors of one base station (e.g., first BS 102) or between beams/sectors of different base stations (e.g., from the first BS 102 to the second BS 104 or one of the other BSs 106).

End users (end user equipment) on the aircraft 150 may communicate with applications and services on the ground (or communicate with other aircraft) by means of the ABR 170 and ATG network 100. Direct network access for end users on the aircraft 150 may therefore be provided via the ABR 170. Access to the ABR 170 may be provided to end users on the aircraft 150 via a wireless network access point (e.g. WiFi, cabin wireless access point (CWAP), hotspot, Bluetooth, and/or the like) or wired network (e.g. Ethernet, A429, and/or the like) to which the ABR 170 is connected. The ABR 170 manipulates incoming/outgoing data according to the employed air interface protocol and passes that data (receives data from) the RAN, which in turn send/receives that data to/from the core network. The core network will then route the data to the appropriate service or application. For example, an end user on the aircraft 150 wishing to use an internet service via a laptop computer may wirelessly attach to a WiFi hotspot in the aircraft 150. The WiFi hotspot may in turn be connected via Ethernet to the ABR 170. The ABR 170 communicates that user data via the RAN to the core network, which in turn routes the end user data to the appropriate location on the Internet 120.

As discussed above, before the ABR 170 and any equipment on the aircraft 150 can operate on the ATG network 100, provisioning and activation of the ABR 170 must be accomplished. Meanwhile, the ATG network 100 is typically optimized for coverage for aircraft that are in-flight. Moreover, coverage provided by the ATG network 100 for assets on the ground is typically either non-existent, insufficient, or at least highly non-representative of the coverage that can be expected while in-flight. As such, testing and maintenance activities that assure or optimize performance while on the ground is normally highly ineffective. Specifically, during installation of communications equipment to provide ATG systems on an aircraft, there is limited or no ability to confirm that the ABR systems have been successfully installed without a "test flight". Additionally, without the appropriate ATG network 100 coverage, there is no (or limited ability) to assure the an ABR 170 is appropriately provisioned in the core network until the aircraft 150 is flown into network coverage and the ABR 170 is either authenticated (allowed to attach because the unit is appropriately provisioned and activated) or denied access (not allowed to attach because the unit is not provisioned and activated on the network). Accordingly, the confirmation of correct/optimized installation of ATG-based ABR equipment, as well as confirmation of provisioning and activation require the "test flight" to be flown, and all of the attendant costs associated therewith to be absorbed. While generally sufficient to achieve the goal, the cost of one or more test flights can be substantial. Accordingly, it is desirable to mitigate these costs by providing an appropriate test system located on the ground that may be used in lieu of (or in advance of) flying the aircraft into ATG coverage to confirm performance and provisioning.

In order to avoid the cost and complication of performing a test flight, example embodiments introduce a dynamic bench testing platform that can be constructed in the lab, and that is configured to enable performance testing of aircraft communications systems that are to be installed on the aircraft 150 before such installation on the aircraft 150 (and therefore with the ABR 170 remains on the ground). In this regard, the dynamic bench testing platform of example embodiments may be configured to allow full performance testing and optimization of the ABR 170 and any components thereof while the aircraft 150 is on the ground. To accomplish this, the dynamic bench testing platform may be configured to simulate free space propagation in a typical ATG environment complete with various levels of fading and signal loss that may be encountered during normal ATG network operations. Additionally, the potential for high amounts of Doppler effects that can accompany communications with high velocity aircraft traveling at altitude either toward or away from a base station must be modeled. As such, movement of the ABR 170 on a simulated aircraft must be capable of modeling, and the dynamic bench testing platform must be further capable of having its simulated base stations conduct beam handovers both intra-site and inter-site.

An instance of the ABR 170, which includes one or more highly complex antennas used to fulfill the requirements of a demanding link budget that may be inherent in a communication link needed to effectively operate in this context, may therefore be fully tested without a test flight (or with fewer test flights). Accordingly, the cost and timing of conducting test flights may be reduced and several scenarios that may otherwise be difficult to test on actual flights, may actually be tailor made in the lab. For example, long duration flight testing or testing in specific weather conditions may be more easily tested in the lab than in the air. The ability to capture realistic data and conduct debugging or other modifications to the system may therefore be greatly enhanced. The dynamic bench testing platform may therefore be capable of confirming appropriate network provisioning and activation by supporting authentication of the ABR 170 and attachment of the ABR 170 to the core network, as well as confirm the operation and performance of the ABR 170 and base station (and/or network) components in various different conditions and scenarios. Moreover, the portable test system may further be configured to confirm end user access to applications and services provided by the ATG network 100 and/or the Internet 120 via the ABR 170.

Figure 2:
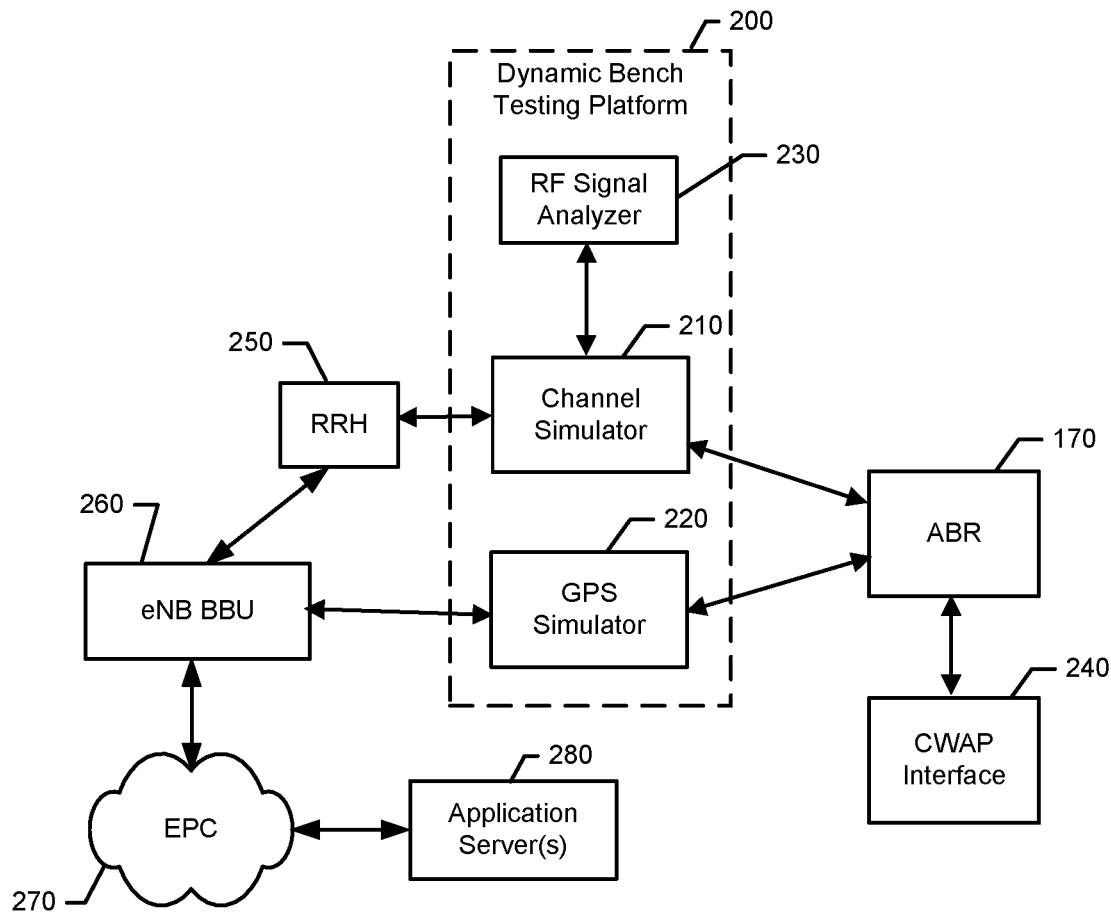
FIG. 2 illustrates a block diagram of various components of a dynamic bench testing platform being employed in a lab context in accordance with an example embodiment.

FIG. 2 illustrates a block diagram of various components of a dynamic bench testing platform 200 of an example embodiment. In some cases, the dynamic bench testing platform 200 may include all of the components shown in FIG. 2. In other words, the system of components shown in FIG. 2 may itself be considered to be the dynamic bench testing platform 200. However, since many of the components tested may actually be components that can be (or may actually be) deployed independently or in combination within the system (or ATG network 100) of FIG. 1, the dynamic bench testing platform 200 could alternatively be considered to be only those components that are unique to the lab environment in which the dynamic bench testing platform 200 operates. Thus, the example of FIG. 2 shows the dynamic bench testing platform 200 to include only those components that are unique to the lab environment associated with institution of the dynamic bench testing platform 200.

In this regard, the dynamic bench testing platform 200 of this example includes a channel simulator 210 and a position simulator (e.g., global positioning system (GPS) simulator 220). The GPS simulator 220 may be configured to simulate aircraft maneuver at high elevations including pitch, roll, yaw, speed, acceleration, etc. The channel simulator 210 may be configured to emulate channel conditions and wireless connectivity in light of the location and maneuvering being performed by the aircraft 150. As such, for example, the dynamic bench testing platform 200 may be configured to provide a robust capability for defining scenarios or test profiles that simulate both aircraft maneuver and network connectivity that would be achieved in corresponding situations. The dynamic bench testing platform 200 may also include a radio frequency signal analyzer 230 operably coupled to the channel simulator 210 to analyze the output of the channel simulator 210 (i.e., the same output that is provided to the ABR 170) in order to evaluate the inputs to the ABR 170. The radio frequency signal analyzer 230 may be one of potentially multiple sensors disposed at various points within the system shown in FIG. 2 to gather information on or otherwise monitor performance criteria. The performance criteria may include physical and network layer measurements. In some cases, the performance criteria may include throughput, quality of service, SNR, Doppler offset, and/or the like, including combinations of these parameters and others.

As shown in FIG. 2, the dynamic bench testing platform 200 may effectively sit between (and bridge the communication gap between) components that are normally land-side (e.g., ATG network 100 components) and components that are air-side (e.g., the ABR 170 and a cabin wireless access point (CWAP) interface 240). Thus, for example, the dynamic bench testing platform 200 may operably couple the ABR 170 to the remote radio head (RRH) 250 of an eNB. The eNB, which may be any of the BSs (i.e., 102, 104, and 106) of FIG. 1, may also include an eNB base band unit (BBU) 260. The eNB BBU 260 may be operably coupled to the EPC 270, which may in turn be operably coupled to one or more application servers 280. As such, the dynamic bench testing platform 200 of this example may replace the antenna(s) to which the RRH 250 would normally be connected, and the antenna(s) to which the ABR 170 would normally be connected.

The dynamic bench testing platform 200 may therefore enable the debugging, testing and troubleshooting of both (or either) air-side and land-side equipment in a controlled environment with controlled variables. In other words, the dynamic bench testing platform 200 may enable the creation of a lab environment in which forward and reverse links for broadband communication over a wireless ATG network can be rigorously tested without actually taking the ABR 170 airborne. As such, system issues can be discovered and troubleshot either before flight testing, or specific issues found during a flight test can be recreated and debugged or troubleshot thereafter on the ground with very high fidelity.

In some cases, various examples of user equipment (UEs) may be placed in communication with the CWAP interface 240 (e.g., via WiFi) to test throughput all the way from the application server(s) 280. For example, a laptop, cell phone, tablet, or the like, or multiple instances of such devices in any combination, may be operably coupled to the CWAP interface 240 in order to access the same or different services associated with the application server(s) 280. Performance and/or user experience may be determined from end to end through the system in this manner. Moreover, in some cases, the UEs may gather user experience data as described in International Patent Application No. PCT/US2020/018728, filed on Feb. 19, 2020, entitled Method and Apparatus for Providing Network Experience Testing, the entire contents of which are hereby incorporated by reference.

The structure shown in FIG. 2 may support simulation of a number of different scenarios that do not involve handover to another eNB. For example, validation of signal to noise ratio (SNR) vs. throughput rate may be handled using the structure of FIG. 2. In this regard, for example, the GPS simulator 220 may define a flight path that does not result in a handover, and the channel simulator 210 may cycle through various channel conditions associated with the geometries the simulated aircraft path presents, and various weather or other simulated impacts. The structure of FIG. 2 may also be used for verification of Doppler performance by simulating a flight path that generates various different Doppler effects and measuring the performance of the system in response to the various different Doppler effects. The structure of FIG. 2 may also be used for SNR based re-entry testing, minimal SNR attach testing, link budget verification, among other things.

Figure 3:
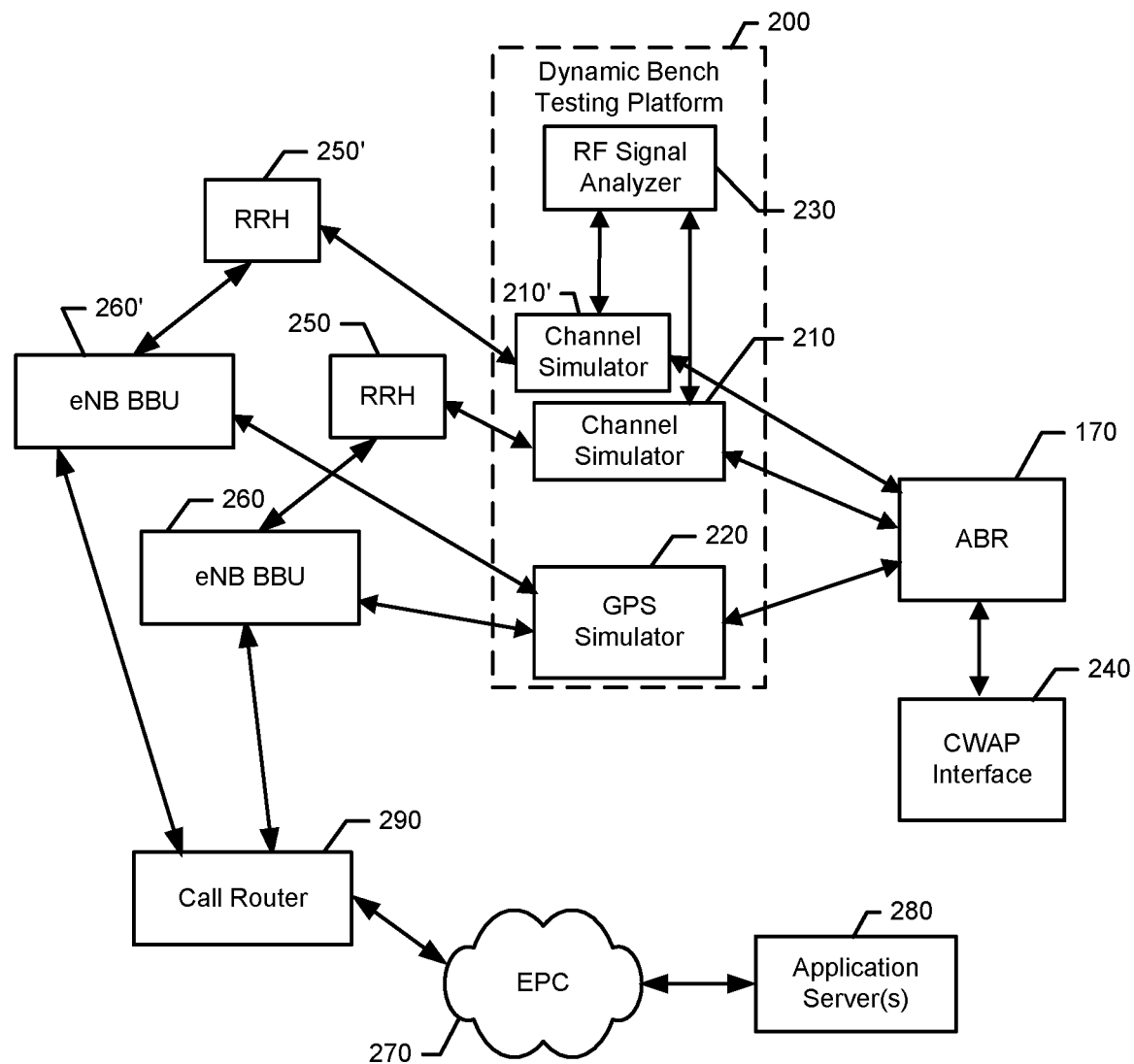
FIG. 3 illustrates a block diagram of the dynamic bench testing platform configured for handling a handover in accordance with an example embodiment.
Figure 4:
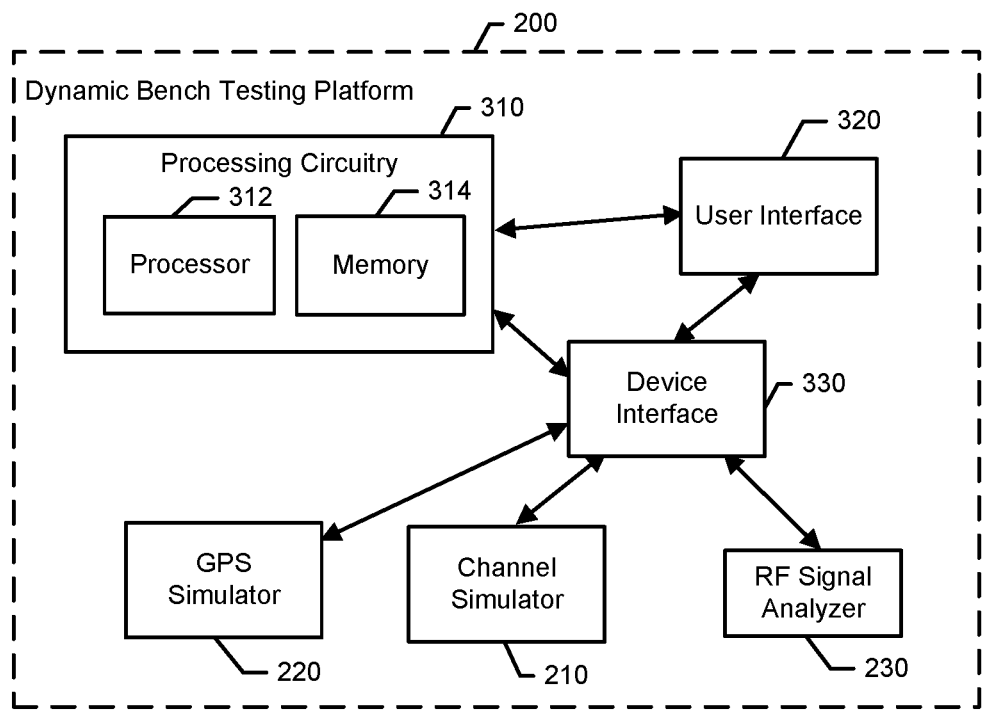
FIG. 4 is a block diagram of the dynamic bench testing platform of an example embodiment.

In order to conduct testing that involves handovers to other eNBs, the structure of FIG. 2 may be modified slightly, as shown in FIG. 3. In this regard, for example, support of handover scenarios may involve the addition of a second RRH 250' and a corresponding second eNB BBU 260' (which may together form a second eNB). Although one instance of the channel simulator 210 may, in some cases, accommodate both (or even additional) instances of the RRH 250 and the second RRH 250', a second channel simulator 210' may also be employed to correspond to each respective one of the instances of the RRH 250 and the second RRH 250'. It also may be necessary or desirable to add additional (i.e., third, fourth, etc.) eNBs (and corresponding RRHs and eNB BBUs) in other testing (e.g., for intra, inter site handover testing) with or without additional channel simulators. However, adding sites should be an elementary modification to the structure of FIG. 3.

When additional sites are added, a call router 290 may be employed to handle cell site selection and handover responsibilities in communication with the ABR 170 and EPC 270. In this regard, for example, the GPS simulator 220 may simulate movement of the ABR 170 toward an edge of the coverage area of one of the sites (e.g., an eNB or BSs 102, 104 and 106). The channel simulator 210 may simulate channel conditions that show weakening of the signal received from the eNB. The signal conditions and/or knowledge of location (and future location) of the ABR 170 may then be used to coordinate a handover to the second eNB. The second channel simulator 210' may simulate improving channel conditions as range decreases to the second site, and the handover may be completed.

The structure of FIG. 3 may also be used in connection with beamforming verification and beam selection testing (e.g., testing each individual beam within a sector of a site). Testing associated with sector traversals and intra site handovers may also be handled using the structure of FIG. 3. Additionally, it may be possible to attach multiple ABRs, each with corresponding flight paths and channel conditions in some cases. In an example embodiment, up to 30 aircraft (and corresponding ABRs) could be attached to a single base station at any given time.

FIG. 3 illustrates the architecture of the dynamic bench testing platform 200 in accordance with an example embodiment. The dynamic bench testing platform 200 may include processing circuitry 310 configured to control the operation of various components or modules of the dynamic bench testing platform 200, and a user interface 320 to facilitate user interaction with the processing circuitry 310. However, in some cases, some or even each of the components may have their own instances of either or both of the processing circuitry 320 and the user interface 320.

The processing circuitry 310 may be configured to perform data processing, control function execution and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with the user interface 320, and in some cases also a device interface 330. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of laptop or personal computer (PC), or multiple instances of the same.

The user interface 320 may be in communication with the processing circuitry 310 to receive an indication of a user input at the user interface 320 and/or to provide an audible, visual, mechanical or other output to the user. As such, the user interface 320 may include, for example, a display, a touchscreen interface, a keyboard, a mouse, a microphone, a speaker, indicator lights, buttons or keys (e.g., function buttons), and/or other input/output mechanisms.

The device interface 330 (if included) may include one or more interface mechanisms for enabling communication with other devices (e.g., modules, entities, and/or other components of the dynamic bench testing platform 200, or in communication therewith). In some cases, the device interface 330 may be any means such as a device or circuitry embodied in either hardware, or a combination of hardware and software that is configured to receive and/or transmit data from/to modules, entities, and/or other components of the dynamic bench testing platform 200 (or system including the same) that are in communication with the processing circuitry 310.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of the dynamic bench testing platform 200 based on inputs received by the processing circuitry 310 responsive to receipt of position information associated with various scenarios defined by the GPS simulator 220 and/or channel condition information provided by the channel simulator 210. As such, in some embodiments, the processor 312 (or the processing circuitry 310) may be said to cause each of the operations described in connection with the dynamic bench testing platform 200 in relation to simulation of the air interface between air-side and land-side components of the ATG network 100 to undertake the corresponding functionalities relating to simulation and testing responsive to execution of instructions or algorithms configuring the processor 312 (or processing circuitry 310) accordingly. In particular, the instructions may include instructions for defining and executing tests or testing procedures and recording performance data associated with such tests or testing procedures for debugging, troubleshooting and/or the like as described herein.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets defining scenarios and/or channel conditions. Among the contents of the memory 314, applications and/or instructions may be stored for execution by the processor 312 in order to carry out the functionality associated with each respective application/instruction. In some cases, the applications may include instructions for providing inputs to control testing of handovers, beamforming, throughput, and various other network performance characteristics as described herein.

In an example embodiment, the GPS simulator 220 may be a flight simulation software suite such as a system tool kit (STK) configured to simulate flight patterns the aircraft 150 may fly. In some cases, the GPS simulator 220 may include a Skydel Software-Defined GNSS Simulator (e.g., Skydel PC along with software defined radios). The GPS simulator 220 may be configured to provide a GPS signal to the ABR 170 so that a priori calculations can be performed. The calculations may be used to determine which eNBs or BSs will be candidates for an LTE (e.g., wireless ATG) connection to the ABR 170. The GPS simulator 220 may further be configured to provide a common, stable time base to the ABR 170 and to the eNB (e.g., the RRHs 250/250' and eNB BBUs 260/260') so that the minimum frequency or amount of training is required on the LTE link. In some cases, additional test instruments may be used for precise measurements of physical and network layer parameters that may be present during flight testing, and such measurements may be used to augment or enhance the flight simulation capabilities of the GPS simulator 220.

In an example embodiment, the channel simulator 210 may be embodied channel emulator such as the Spirent Vertex® Channel Emulator. However, other channel emulators could be employed in alternative embodiments. The channel simulator 210 may be a module configured to provide simulation of various RF signal perturbations that may be specific to the ATG network 100. The channel simulator 210 may be configured to model Doppler effects, timing advance caused by long ranges (between the aircraft 150 and BSs 102, 104 or 106) associated with the ATG network 100, RF signal losses that are proportional to antenna patterns associated with the highly complex antennas employed on the aircraft 150 and BSs 102, 104 or 106. The channel simulator 210 may also be configured to simulate flight dynamics of the aircraft 150 as the aircraft 150 experiences pitch, roll, and yaw in flight (as simulated by the GPS simulator 220). Thus, any flight pattern that can be performed by the aircraft 150 may first be simulated by the GPS simulator 220, the simulated flight pattern may then be provided to the channel simulator 210 and automated software tools associated therewith may build a batch of time based data series to generate channel emulator activity of the channel simulator 210.

In some cases, in addition to the radio frequency signal analyzer 230, other lab test equipment may be employed. For example, a signal generator, vector network analyzer, and various RF accessories such as filters, duplexers, network switches, attenuators, splitters, directional couplers, loads and jumpers may be employed to facilitate construction of the dynamic bench testing platform 200. Moreover, as noted above, multiple instances of processing circuitry 310 (or computers/laptops) may be employed and configured to perform corresponding specific tasks or functions. For example, an eNB KPI (key performance indicator) monitoring script, ping testing, iperf testing, etc., may be defined and run on the processing circuitry 310 (or another instance thereof). As such, the processing circuitry 310 may monitor (via the radio frequency signal analyzer 230 and/or other sensors or measurement devices located at various points in the system) performance criteria and output copies or reports of the same to the user interface 320 or other output devices.

The dynamic bench testing platform 200 described herein provides channel emulation capabilities for modeling fading environments for free pathloss propagation and other RF factors along with position information simulation to both the ABR 170 and the eNB BBU 260. Thus, the dynamic bench testing platform 200 provides a fully programmable system with test functions that can be implemented by executing software on the hardware of the dynamic bench testing platform 200. The dynamic bench testing platform 200 is capable of running a single test script or running a series of test scripts in an automated fashion, thereby providing test setup guidance and test results via the user interface 320. In some cases, test instruments may also be software defined, and may be controlled, monitored and measured by the dynamic bench testing platform 200. Thus, the dynamic bench testing platform 200 may provide full end-to-end validation of ATG network components including both land-side and air-side components. Authentication and network access may also be provided (end-to-end) for provisioning services and enabling end user access to ATG network services and the Internet. The dynamic bench testing platform 200 can also be quickly modified to accommodate new test procedures and new scenarios.

Figure 5:
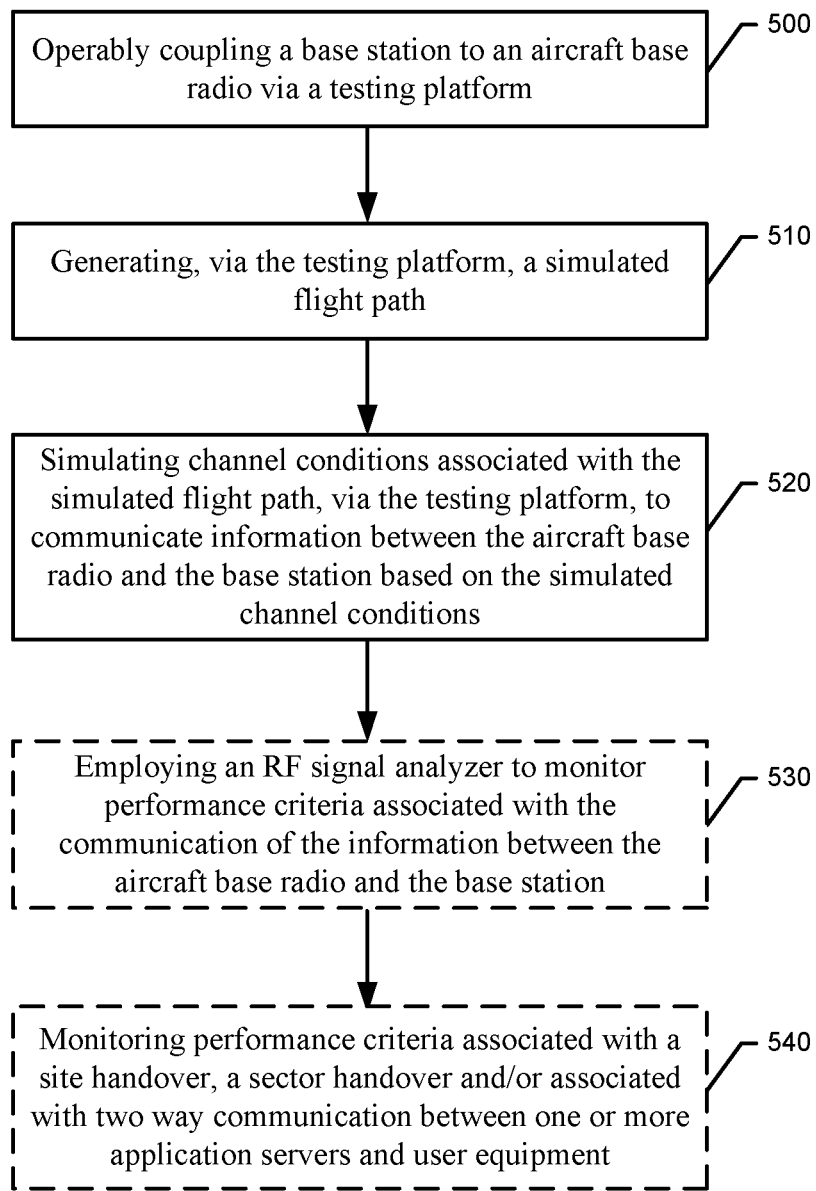
FIG. 5 illustrates a block diagram of a method of testing airborne and ground based ATG communication equipment in a lab environment according to an example embodiment.

FIG. 5 is a block diagram of a method of testing airborne and ground based ATG communication equipment in a lab environment (i.e., without actual test flights). The method may include operably coupling a base station to an aircraft base radio via a testing platform at operation 500. The method may further include generating, via the testing platform, a simulated flight path at operation 510. The method may also include simulating channel conditions associated with the simulated flight path, via the testing platform, to communicate information between the aircraft base radio and the base station based on the simulated channel conditions at operation 520. In some cases, the method may include further optional operations, some of which are shown in dashed lines in FIG. 5. In this regard, for example, the method may further include employing a radio frequency signal analyzer to monitor performance criteria associated with the communication of the information between the aircraft base radio and the base station at operation 530. Alternatively or additionally, the method may include monitoring performance criteria associated with a site handover, a sector handover and/or associated with two way communication between one or more application servers (communicatively coupled to the base station) and user equipment (communicatively coupled to the aircraft base radio) at operation 540.

In accordance with an example embodiment, an ATG communication system testing platform may be provided. The testing platform may be configured to operably couple a base station to an aircraft base radio in a lab environment. The testing platform may include a position simulator and a channel simulator. The position simulator may be configured to generate simulated aircraft position information and communicate the simulated aircraft position information to an aircraft base radio and a base band unit of the base station. The channel simulator may operably couple a remote radio head of the base station to the aircraft base radio, and may be configured to emulate channel conditions with respect to transmission of signaling generated by the remote radio head for communication to the aircraft base radio based on the emulated channel conditions.

In some embodiments, the system (and corresponding components thereof) may be configured to include additional features, optional features, and/or the features described above may be modified or augmented. Some examples of modifications, optional features and augmentations are described below. It should be appreciated that the modifications, optional features and augmentations may each be added alone, or they may be added cumulatively in any desirable combination. In this regard, for example, the testing platform may further include a radio frequency signal analyzer operably coupled to an output of the channel simulator. In an example embodiment, the position simulator may be configured to generate one or more flight paths comprising the simulated aircraft position information, and the channel simulator may be configured to emulate the channel conditions corresponding to the one or more flight paths. In some cases, the channel simulator may be configured to emulate the channel conditions corresponding to pitch, roll and yaw for each simulated position of the aircraft relative to the base station at respective positions along the one or more flight paths. In an example embodiment, the channel simulator may be configured to emulate Doppler effect and timing advance for each simulated position of the aircraft relative to the base station at respective positions along the one or more flight paths. In some cases, the position simulator may be further operably coupled to a second base station, and the one or more flight paths may include at least one flight path corresponding to a site handover from the base station to the second base station. In an example embodiment, a second channel simulator may be operably coupled to the second base station and the aircraft base radio, and the testing platform is configured to monitor performance criteria associated with the site handover. In some cases, the testing platform may be configured to monitor performance criteria associated with sector handover for sectors of the base station or the second base station. In an example embodiment, the testing platform may be further operably coupled to one or more application servers via an evolved packet core, and operably coupled to one or more instances of user equipment via the aircraft base radio. The testing platform may be configured to monitor performance criteria associated with two way communication between the one or more application servers and the user equipment. In some cases, the performance criteria may include throughput, quality of service, signal to noise ratio, and Doppler offset.

Figure 6:
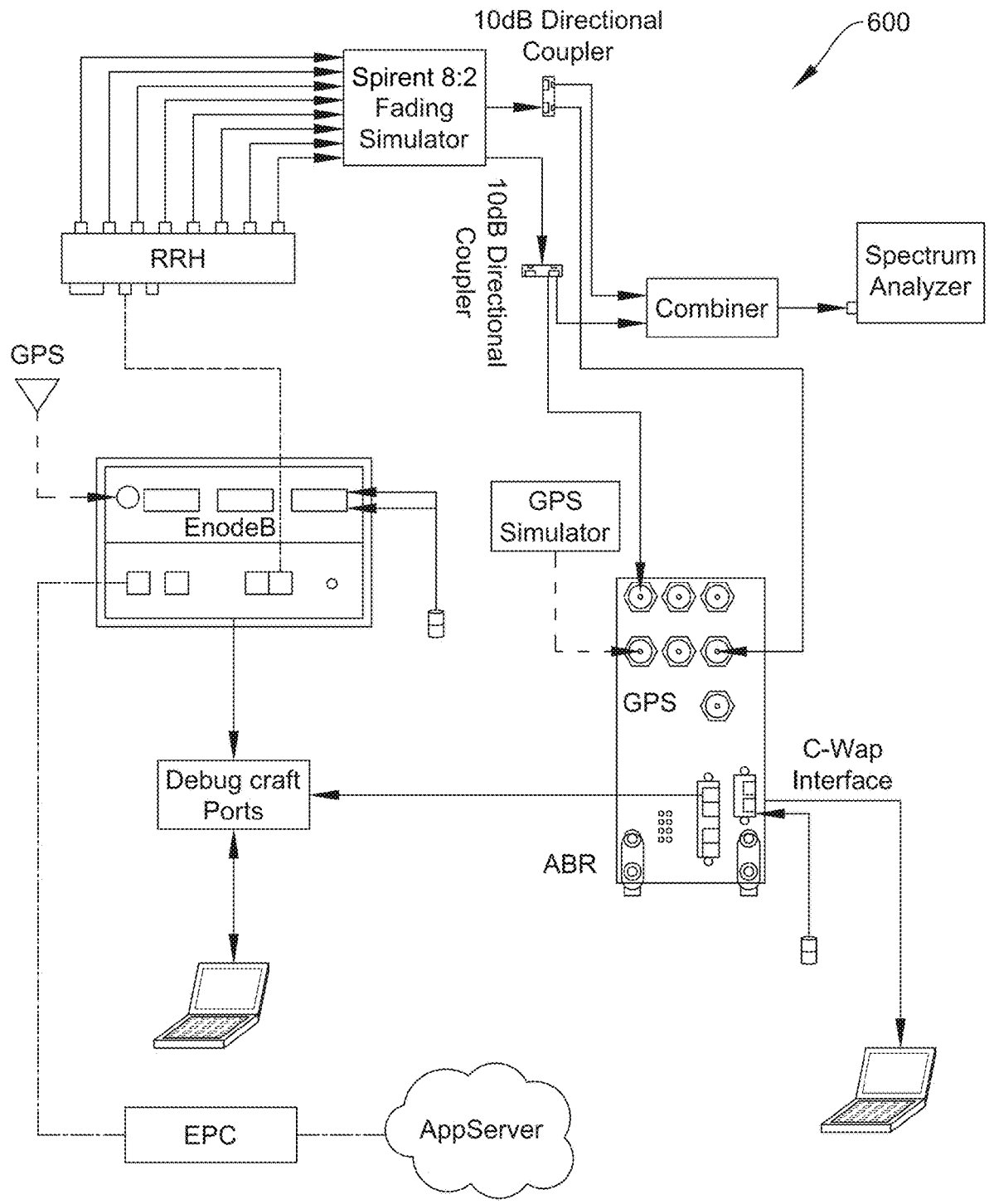
FIG. 6 illustrates a circuit diagram showing some example components that may be used to implement the block diagram of FIG. 2 in accordance with an example embodiment.
Figure 7:
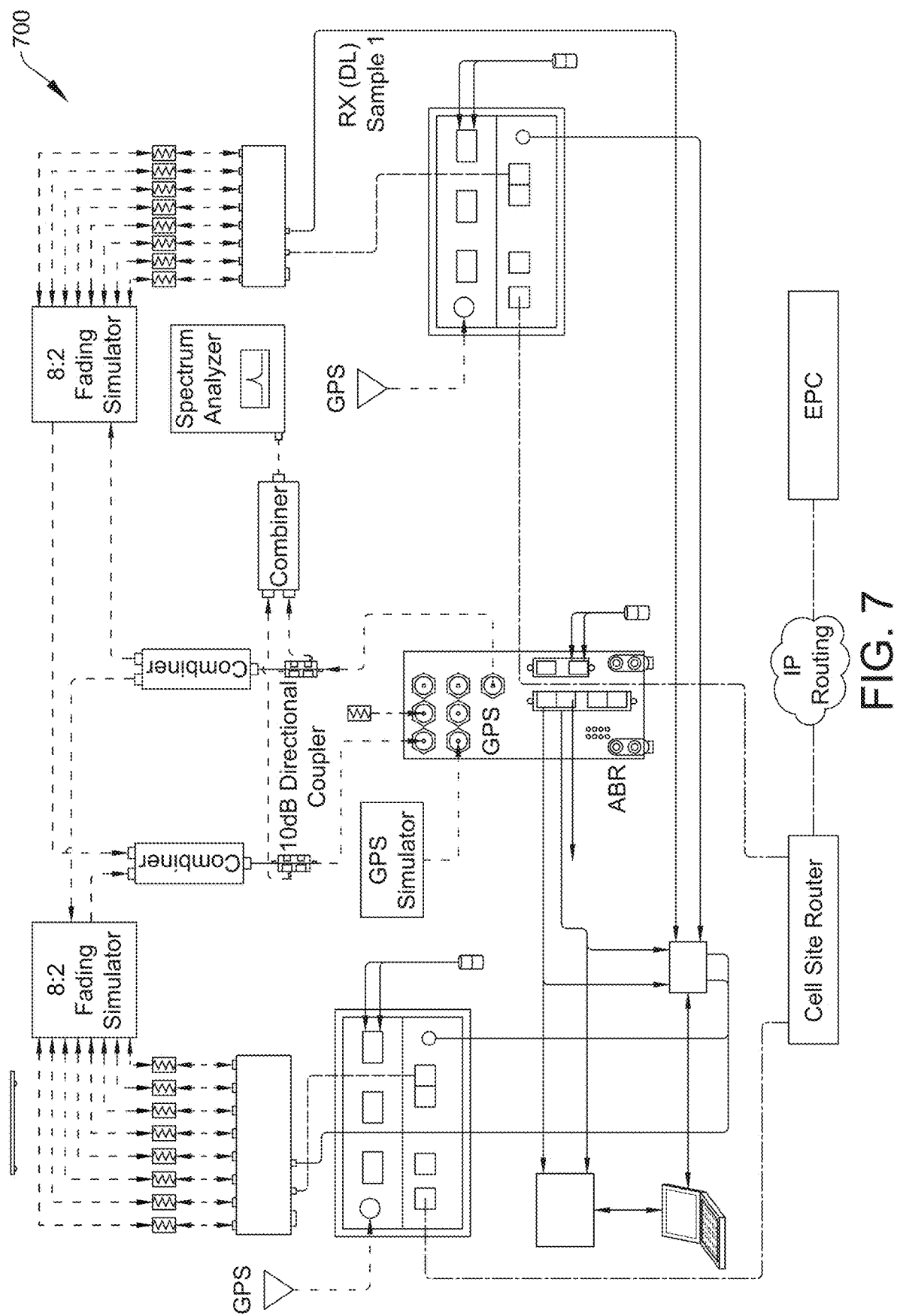
FIG. 7 illustrates a circuit diagram showing some example components that may be used to implement the block diagram of FIG. 3 in accordance with an example embodiment.

FIG. 6 illustrates a circuit diagram 600 showing some example components that may be used to implement the block diagram of FIG. 2. Meanwhile, FIG. 7 illustrates a circuit diagram 700 showing some example components that may be used to implement the block diagram of FIG. 3.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An air to ground (ATG) communication system testing platform configured to operably couple a base station to an aircraft base radio in a lab environment, the testing platform comprising:
   a position simulator configured to generate simulated aircraft position information and communicate the simulated aircraft position information to an aircraft base radio and a base band unit of the base station; and
   a channel simulator operably coupling a remote radio head of the base station to the aircraft base radio, the channel simulator being configured to emulate channel conditions with respect to transmission of signaling generated by the remote radio head for communication to the aircraft base radio based on the emulated channel conditions.

2. The testing platform of claim 1, further comprising a radio frequency signal analyzer operably coupled to an output of the channel simulator.

3. The testing platform of claim 1, wherein the position simulator is configured to generate one or more flight paths comprising the simulated aircraft position information, and
   wherein the channel simulator is configured to emulate the channel conditions corresponding to the one or more flight paths.

4. The testing platform of claim 3, wherein the channel simulator is configured to emulate the channel conditions corresponding to pitch, roll and yaw for each simulated position of the aircraft relative to the base station at respective positions along the one or more flight paths.

5. The testing platform of claim 3, wherein the channel simulator is configured to emulate Doppler effect and timing advance for each simulated position of the aircraft relative to the base station at respective positions along the one or more flight paths.

6. The testing platform of claim 3, wherein the position simulator is further operably coupled to a second base station, and
   wherein the one or more flight paths include at least one flight path corresponding to a site handover from the base station to the second base station.

7. The testing platform of claim 6, wherein a second channel simulator is operably coupled to the second base station and the aircraft base radio, and
   wherein the testing platform is configured to monitor performance criteria associated with the site handover.

8. The testing platform of claim 7, wherein the testing platform is configured to monitor performance criteria associated with sector handover for sectors of the base station or the second base station.

9. The testing platform of claim 3, wherein the testing platform is further operably coupled to one or more application servers via an evolved packet core, and operably coupled to one or more instances of user equipment via the aircraft base radio, and wherein the testing platform is configured to monitor performance criteria associated with two way communication between the one or more application servers and the user equipment.

10. The testing platform of claim 9, wherein the performance criteria include throughput, quality of service, signal to noise ratio, and Doppler offset.

11. A method of testing airborne and ground based air-to-ground (ATG) communication equipment, the method comprising:

operably coupling a base station to an aircraft base radio via a testing platform;

generating, via the testing platform, a simulated flight path; and simulating channel conditions associated with the simulated flight path, via the testing platform, to communicate information between the aircraft base radio and the base station based on the simulated channel conditions, wherein generating the simulated flight path comprises generating one or more flight paths comprising a simulated movement of the aircraft base radio, wherein simulating the channel conditions comprises emulating the channel conditions corresponding to the one or more flight paths, wherein the testing platform comprises a position simulator operably coupled to the base station and a second base station, and wherein the one or more flight paths include at least one flight path corresponding to a site handover from the base station to the second base station.

12. The method of claim 11, further comprising employing a radio frequency signal analyzer to monitor performance criteria associated with the communication of the information between the aircraft base radio and the base station.

13. The method of claim 11, wherein emulating the channel conditions comprises emulating the channel conditions corresponding to pitch, roll and yaw for the simulated movement of the aircraft base radio at respective positions along the one or more flight paths.

14. The method of claim 11, wherein emulating the channel conditions comprises emulating Doppler effect and timing advance for each simulated position of the simulated movement of the aircraft base radio at respective positions along the one or more flight paths.

15. The method of claim 11, wherein a second channel simulator is operably coupled to the second base station and the aircraft base radio, and wherein the method further comprises monitoring performance criteria associated with the site handover.

16. The method of claim 15, wherein the method further comprises monitoring performance criteria associated with sector handover for sectors of the base station or the second base station.

17. A method of testing airborne and ground based air-to-ground (ATG) communication equipment, the method comprising:

operably coupling a base station to an aircraft base radio via a testing platform;

generating, via the testing platform, a simulated flight path; and simulating channel conditions associated with the simulated flight path, via the testing platform, to communicate information between the aircraft base radio and the base station based on the simulated channel conditions, wherein generating the simulated flight path comprises generating one or more flight paths comprising a simulated movement of the aircraft base radio, wherein simulating the channel conditions comprises emulating the channel conditions corresponding to the one or more flight paths, wherein the testing platform is further operably coupled to one or more application servers via an evolved packet core, and operably coupled to one or more instances of user equipment via the aircraft base radio, and wherein the method further comprises monitoring performance criteria associated with two way communication between the one or more application servers and the user equipment.

18. The method of claim 17, wherein the performance criteria include throughput, quality of service, signal to noise ratio, and Doppler offset.

* * * * *